United States Patent [19]
Graham

[11] 3,753,582
[45] Aug. 21, 1973

[54] COUPLING UNIT
[75] Inventor: Charles H. Graham, Los Altos, Calif.
[73] Assignee: Anarak Incorporated, Mountain View, Calif.
[22] Filed: Nov. 9, 1971
[21] Appl. No.: 196,975

[52] U.S. Cl...................... 285/305, 292/17, 85/8.8, 24/211 L
[51] Int. Cl.............................................. F16l 37/14
[58] Field of Search................... 285/305, 319, 320, 285/189, 150; 137/271; 292/17; 70/381; 24/110, 211 L; 85/8.8

[56] References Cited
UNITED STATES PATENTS

| | | | |
|---|---|---|---|
| 2,021,241 | 11/1935 | Mall | 285/305 X |
| 1,513,710 | 10/1924 | Lewis | 285/305 X |
| 3,628,768 | 12/1971 | Hutt | 285/305 X |
| 3,560,027 | 2/1971 | Graham | 285/305 X |
| 3,534,988 | 10/1970 | Lindsey | 285/305 |
| 3,314,696 | 4/1967 | Ferguson et al. | 285/305 X |

*Primary Examiner*—Thomas F. Callaghan
*Assistant Examiner*—Wayne L. Shedd
*Attorney*—Paul D. Flehr, Milton W. Schlemmer et al.

[57] ABSTRACT

An easily operable quick-acting coupling unit including a pair of telescopic members, the female member carrying resilient locking means, and the male member being shaped for engagement by said locking means when inserted in the female member by a snap-in action; said locking means being movable to a release position to permit separation of said members.

4 Claims, 5 Drawing Figures

Patented Aug. 21, 1973 3,753,582
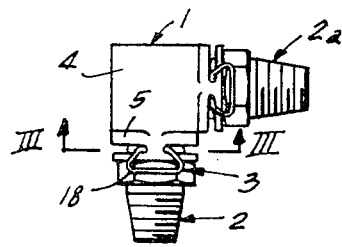
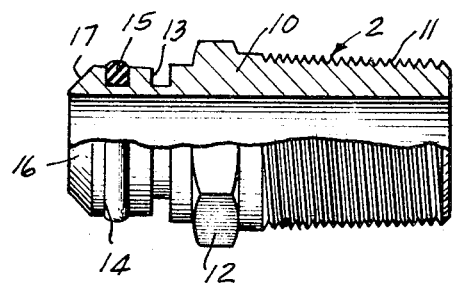
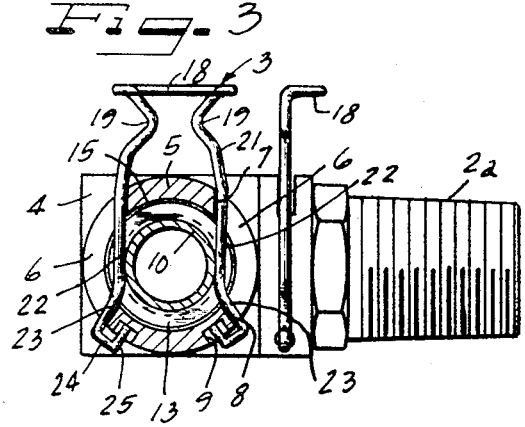
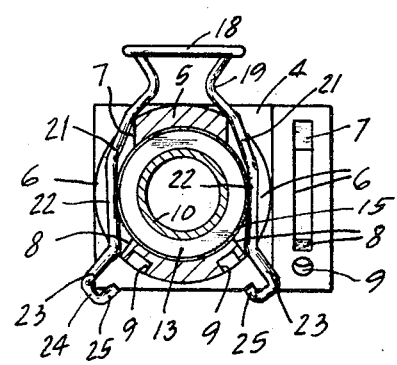
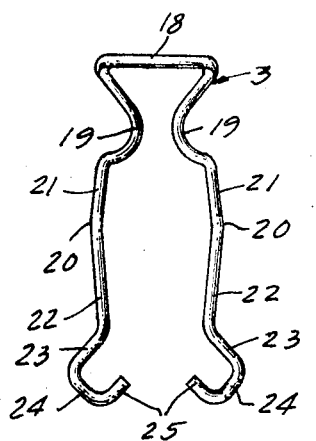

COUPLING UNIT

SUMMARY OF THE INVENTION

The instant invention is an improvement upon my prior U.S. Letters Pat. No. 3,512,808, dated May 19, 1970; No. 3,523,701, dated Aug. 11, 1970; and No. 3,538,940, dated Nov. 10, 1970. Prior coupling units embodied locking clips that were not retained upon either the female or the male elements but required removal and re-insertion when connections or disconnections were made. In such instances, the locking clip was subject to being dropped, mislaid, damaged, or lost. In other instances, a locking clip was retained upon one of the members against accidental removal therefrom, and in may cases required an additional part, but in all cases of which I am aware, required the positively retained loss-proof locking clip to be manually manipulated both when the members were connected and when they were disconnected.

The instant invention provides a telescopic coupling unit that is more easily and rapidly actuated to establish a connection or disconnection than coupling units heretofore used, thereby expediting quick connections when necessary and saving labor on any connection. In general, the instant invention requires less parts than most of the prior structures. In this invention, the male member is provided with a beveled nose which cams apart the legs of the coupling clip to permit entry into the female member so that the members may be firmly connected by merely pushing the male member into the female member in a snap-in manner. If the female member is firmly anchored to other apparatus, the connection may be made with only one hand pushing in the male member. The member carrying the locking clip is provided with cam surfaces so associated with the clip that an easy pressing down of the clip with the thumb or finger releases the same from locking engagement and permits a ready and easy removal of the male member. If the coupling member is utilized in a fluid flow system, the female member may be provided with a plurality of openings to accommodate a plurality of male members, and if a connection is made in mechanical operating mechanism the female member may have only one socket and the male member makes a solid driving connection therewith. The instant invention will have numerous uses and purposes as will be apparent to those skilled in the art. Thus, this invention solves the problems and disadvantages of coupling units of the same general character used heretofore.

Other objects, features and advantages of the invention will be readily apparent from the following description of a certain preferred embodiment thereof, taken in conjunction with the accompanying drawing, although variations and modifications may be effected without departing from the spirit and scope of the novel concepts of the disclosure.

BRIEF DESCRIPTION OF THE DRAWINGS

FIG. 1 is a plan view of a coupling unit fully assembled for operation, there being two male members associated with a single female member in this instance;

FIG. 2 is a part sectional part elevational enlarged view of a male coupling member alone;

FIG. 3 is a vertical sectional view taken substantially as indicated by the line III—III of FIG. 1;

FIG. 4 is a view similar in character to FIG. 3 but with the second male member and the corresponding locking clip omitted for purposes of clarity; and FIG. 5 is an elevational view of the locking clip alone in enlarged size.

DETAILED DESCRIPTION OF THE PREFERRED EMBODIMENT

As stated above, the instant coupling unit is satisfactory for use on solid elements such as mechanically operating parts and also upon hollow elements for use in fluid lines. If the coupling is used for mechanical parts, the male member may be solid throughout and the female member merely having a recess deep enough to receive the end part of the male member. By way of example, and not by way of limitation, the invention is herein disclosed and described for connection in a fluid line. The invention, as illustrated, comprises three parts, namely, a female member generally indicated by numeral 1, a male member generally indicated by numeral 2, and a locking clip generally indicated by numeral 3.

The female member 1, in the illustrated instance, comprises a hollow body 4 which, for example, may be in the form of a square block having a fluid flow passage therethrough. Extending from one face of the block is a neck 5 which is usually round to accommodate a round male member. The neck, of course, is hollow and includes a portion of said flow passage which is circularly cylindrical in cross-section. Said neck is provided with diametrically opposed slots 6—6 which slots are open entirely through the neck into said flow passage. At like ends, each slot terminates in a face 7 which substantially parallels the transverse axis of the neck between the slots, and at the other like ends each slot terminates in a cam face 8 that is oblique to the aforesaid axis, as best seen in FIG. 4. In annular alignment with each slot 6, the neck 5 is provided with a notch or recess 9 adjacent but slightly spaced from the respective cam face 8. These recesses afford anchoring means for the locking clip 3 as will later appear herein. The wall of each recess parallels the adjacent cam edge or face 8.

The male member 2, best seen in FIG. 2 comprises a hollow body or barrel 10 and is generally round or circularly cylindrical in cross-section so a portion of it may project into the that portion of the flow passage which extends through the aforesaid neck 5 on the body 4 of the female member 1. The body 10 is provided with an outwardly projecting externally threaded portion 11 for the attachment of a fluid line or other means thereto. Since the male member may rotate after engagement with the female member it is provided with a nut-like portion 12 to accept a small wrench in case adjustment is necessary between the male member and the line threaded thereto. The portion of the barrel 10 inwardly of the nut-like portion 12 is provided with an annular groove 13 for ultimate reception of the legs of the locking clip 3. Inwardly of the groove 13 another annular groove 14 is provided in which is seated an O-ring 15 to effect a fluid tight seal between the male and female members when connected. Inwardly of the O-ring 15 the barrel 10 comprises a nose 16 annularly beveled to provide a surrounding cam face 17 to cam apart or spread the legs of the locking clip when the male member enters the female member.

With reference now to FIG. 3, it will be seen that the locking clip comprises a single piece of round spring wire shaped generally in the form of an inverted U. The closed end or bight portion 18 of the clip is bent outwardly, as seen clearly in FIGS. 1 and 3, to form a pressure seat for a finger or thumb to actuate the clip. Below the bent end portion 18 the legs of the hook are bent inwardly toward each other as at 19—19 to form a stop to limit the inward movement of the clip under pressure. As the legs continue, slight outward bends 20—20 are provided leaving slightly inwardly sloping portions 21—21 to ride on opposite sides of the upper edges of faces 7—7 in the neck of the female member while the portions 22—22 on the opposite side of the bends 20—20 pass through the slots 6 and across portions of the bore of the neck 5. It is these portions 22—22 of the clip that actually lock the male member in the female member. The terminal portion of each leg of the clip is in the form of a hook including a shank 23 leading to the bend 24 and terminating in a prong 25 extending obliquely inwardly and upwardly parallel to the shank 23 generally back toward bight portion 18. The hooks are precisely the same except for their allochiral relationship, and turn inwardly to confront each other. The clip being of spring wire inherently bends to assume the position seen in FIG. 5 at all times. The bends in the formation 18 above the bends 19—19 in the legs provide a configuration wherein the lock clip 3 has no reverse spring loading during spreading of the legs of the clip.

The clip is easily assembled on the neck portion 5 of the body of the female member 1 by simply turning the clip to a substantially horizontal position relatively to the position it ultimately assumes, inserting one of the hook portions at the end of the leg into a slot 6, turning the clip to the useful position and inserting the other hook portion in the other slot 6, then pressing on the part 18 until the legs are spread by the cam surfaces 8—8 aided by the portion 21 of the clip being cammed out by the edges on the faces 7—7 at the other end of the slots, with the legs sufficiently spread so that the clips may be released and spring back to the position seen in FIG. 3 with the prongs 25—25 of the hook portions engaging in the notches 9—9. It will be noted that the distance between the notches is greater than the distance between the prongs 25—25 of the clip as seen in FIG. 5 and before it is connected to the female member. Accordingly, when connected, the clip is under some tension at all times and thus is prevented from becoming accidentially dislodged from the slots 6 in the female member. Separation of the clip from the slots in either direction of slidable movement thereof in the slots is precluded by prongs 25 and bight portion 18 of the clip engaging adjacent portions of neck 5.

In FIG. 3 I have illustrated the male and female members engaged with the portions 22—22 of the clip legs extending through the groove 13 in the male member, and the engagement is held secure by the clip legs at diametrically opposite regions so that the inserted portion of the male member cannot be wobbled in any way to break the seal established by the O-ring. The parts 23—23 of the clip rest intimately upon the cam surfaces 8—8 at the bottom ( as illustrated) of the slots 6—6, and the prongs 25—25 contact the bottom of the respective recesses 9—9.

When it is desired to remove the member 2 from assembled position, it is simply necessary to push inward on the part 18 of the clip until it assumes the position seen in FIG. 4. When pushed inward the clip spreads due to the hook shanks 23—23 riding over the cam surfaces 8—8, and such action is aided by the portions 21—21 of the clip camming over the upper edges of the faces 7—7. The bends 19—19 in the clip prevent excess downward movement stopping against the top of the neck 5. With the hook portions of the clip out of the respective recesses 9—9, the legs of the clip are drawn entirely out of the groove 3 in the member 2, and it is easily pulled out and separated from the female member.

It is a simple expedient to establish connection between the members 1 and 2. This may be done with one hand if the member 1 is firmly anchored by simply grasping the member 2 and pushing the nose thereof into a port of entry in member 1. In so doing, the beveled nose 17 on the member 2 cams the legs of the locking clip apart withdrawing the hook portions at the same time substantially out of the respective recesses 9—9, and as soon as the portion 13 reaches the plane of the clip legs they will immediately snap in and assume the position seen in FIG. 3 effectively locking member 2 to member 1 in a tight connection. It should be noted that since the clip is made of round wire and the beveled nose on the member 2 establishes a smooth expansion of the clip, there will be no abrasion or any other injury resulting to the O-ring 15. Also, nothing need be done to establish the connection but a mere push of the member 2 into member 1. The locking clip need not be touched at all. Accordingly, it will be noted that with the aid of the instant coupling unit connections may be established, fluid tight if desired, with an ease and rapidity not heretofore obtained.

In FIGS. 1 and 2 I have illustrated a second connection between the male and the female members designated 2a to indicate that there may be as many as desired connections with the female member 1 up to the capacity of the member. Also, it is not necessary that the member 1 be in the form of a hollow block, but it may at times be merely a neck portion 5 located on the end of a shaft, a hose, or other article, but the same coupling means may establish the desired connection.

It should be noted that the instant coupling can be separated in a foolproof manner when out of sight and with one hand only. This becomes important when the coupling is located where it is impossible to reach the area with both hands at the same time. The simple one-hand separation of the spring clip embodied in the instant invention makes it virtually impossible to insert the clip inadvertently into the O-ring groove and thus causing the fitting to leak. It also substantially eliminates the possibility of dropping the clip somewhere into the madhine, which would require sometimes major dismantling of the machine to recover the clip.

I claim:

1. In combination in a manually operable quick disconnect coupling unit for use in fluid transmission defined by cooperable telescopically engageable snap-together male and female coupling members which are connectable with or disconnectable from each other by utilizing only one hand, said male member including a circularly cylindrical nose portion carrying a sealing ring thereon and having a peripheral groove formed therein, said male member being receivable in leak-proof fashion within said female member without precluding relative rotation between said members: said female member comprising a hollow coupling body having a neck portion projecting from at least one side thereof, a flow passage extending through said body and said neck portion, at least part of said flow passage being circularly cylindrical in cross-section in which said male member nose is rotatably receivable when said members are connected with said sealing ring on said male member nose contacting the inner periphery of said flow passage to prevent leakage between said members when connected, and diametrically opposed generally parallel slots formed through said neck portion and opening onto that portion of said flow passage which is defined by said neck portion; and a generally U-shaped spring locking clip defined by a closed bent bight portion at one end thereof and a pair of generally parallel legs extending from said bight portion, each of said legs terminating in a hook-shaped end portion which includes a generally reversely bent prong which extends inwardly of said clip generally back toward said bight portion; said slots in said female member neck portion each terminating in an oblique cam face at one end thereof, and recesses in said neck portion adjacent each said cam face; said locking clip being captively retained on said coupling body neck portion with said legs thereof slidably received in said opposed slots with said prongs positioned adjacent said recesses for selective movement into and out of said recesses, said clip being positively retained against separation from said neck portion by said prongs entering said recesses as said clip is slidably moved in one direction and by said bight portion contacting said neck portion as said clip is slidably moved in the other direction; said clip legs normally extending through said slots into said flow passage and partially blocking said passage whereby said clip may be engaged in said male member nose portion groove when said nose portion is telescopically inserted into said passage, said clip legs being selectively and resiliently spreadable away from each other into said slots and out of said flow passage as said clip end portions contact said cam faces as said clip is slidably moved in said slots in said other direction so that said nose portion may be selectively disengaged from within said flow passage.

2. The coupling unit of claim 1 in which said slots at their ends opposite said cam faces terminate in generally parallel faces engageable by said clip legs when said clip is slidably moved in said slots in said one direction to engage said prongs in said recesses.

3. The coupling unit of claim 1 in which said bight portion of said locking clip is bent out of the plane of said clip legs to provide a seat for engagement by a hand to effect selective sliding movement of said clip in said slots in either of said directions.

4. The coupling unit of claim 1 in which said female body includes at least one other neck portion, and an associated retainer clip thereon, constructed as set out in claim 1; said other neck portion being adapted to receive another male member nose portion therein which is constructed as recited in claim 1; said flow passage extending into and through said other neck portion whereby fluid may flow from said first memtioned neck portion into and through said other neck portion.

* * * * *